United States Patent
Watson et al.

(10) Patent No.: US 6,853,617 B2
(45) Date of Patent: Feb. 8, 2005

(54) SYSTEM AND METHOD FOR TCP CONNECTION PROTECTION SWITCHING

(75) Inventors: Thomas L. Watson, Richardson, TX (US); David D. Baukus, McKinney, TX (US); Ronald Paul Folkes, Dallas, TX (US); Lance Arnold Visser, Dallas, TX (US)

(73) Assignee: Chiaro Networks, Ltd., Richardson, TX (US)

( * ) Notice: Subject to any disclaimer, the term of this patent is extended or adjusted under 35 U.S.C. 154(b) by 777 days.

(21) Appl. No.: 09/852,223

(22) Filed: May 9, 2001

(65) Prior Publication Data

US 2002/0167952 A1 Nov. 14, 2002

(51) Int. Cl.[7] .............................................. G01R 31/08
(52) U.S. Cl. ........................................ 370/218; 370/242
(58) Field of Search ................................ 370/216–228, 370/241–252, 241.1, 389, 395.1, 351–3, 359

(56) References Cited

U.S. PATENT DOCUMENTS

| | | | | | |
|---|---|---|---|---|---|
| 5,913,921 | A | * | 6/1999 | Tosey et al. ................ | 709/220 |
| 5,968,185 | A | | 10/1999 | Bressoud et al. | |
| 6,035,415 | A | | 3/2000 | Fleming | |
| 6,049,524 | A | * | 4/2000 | Fukushima et al. ......... | 370/220 |
| 6,556,547 | B1 | * | 4/2003 | Srikanth et al. ............ | 370/317 |
| 6,618,389 | B2 | * | 9/2003 | Hoefelmeyer et al. ...... | 370/401 |
| 6,760,777 | B1 | * | 7/2004 | Agarwal et al. ............ | 709/238 |

FOREIGN PATENT DOCUMENTS

WO     WO-02/03611 A2    1/2002

OTHER PUBLICATIONS

Metz, Christopher; IP Protection and Restoration; Apr. 2000; IEEE Internet Computing, PP: 97–102.*
Stevens, RIchard; TCP/IP Illustrated, vol. 1; 1994; Addison–Wesley; PP: 226, 503–506.*
U.S. Appl. No. 09/703,057, filed Oct. 31, 2000, Brewer et al.
"Fault–Tolerant Architecture for Communication Adapters and Systems" IBM Technical Disclosure Bulletin, IBM Corp. New York, US. vol. 35, No. 7, Dec. 1, 1992, pp. 300–303.
Zhang et al: "A Persistent Connection Moel for Mobile and Distributed Systems" Proceedings of the International Conference on Computer Communications and Networks, Sep. 20, 1995, pp. 300–307.
"CISCO 7500 Series" CISCO Systems Product Announcement, 1997, pp. 1–17.
"The Evolution of High–End Router Architectures" CISCO Systems White Paper, Jan. 31, 2001, pp. 1–11.
Search Report Dated Sep. 11, 2002 (EP 02 25 3109).

* cited by examiner

*Primary Examiner*—David Vincent
(74) *Attorney, Agent, or Firm*—Fulbright & Jaworski L.L.P.

(57) ABSTRACT

If an active router Master Control Processor (MCP) fails, a backup MCP switches over without interrupting peer network router connections, because all previously established connection parameters are replicated on both MCPs. Once the MCP programs line cards, the packet forwarding modules and embedded system function without further involvement of the MCP until the next programming update. Messages flow through the backup MCP and then through the active MCP, which outputs messages through the backup MCP. Thus the backup MCP captures state changes before and after the active MCP. Both MCPs maintain replicated queues in which they store replicated messages awaiting processing or retransmission. If acknowledgment of receiving a transmitted message is received from a destination peer router, that message is deleted from both MCPs. If acknowledgment is not received within a predetermined interval, the stored message is retransmitted. Message splicing prevents lost and partially transmitted messages during and after switchovers.

31 Claims, 4 Drawing Sheets

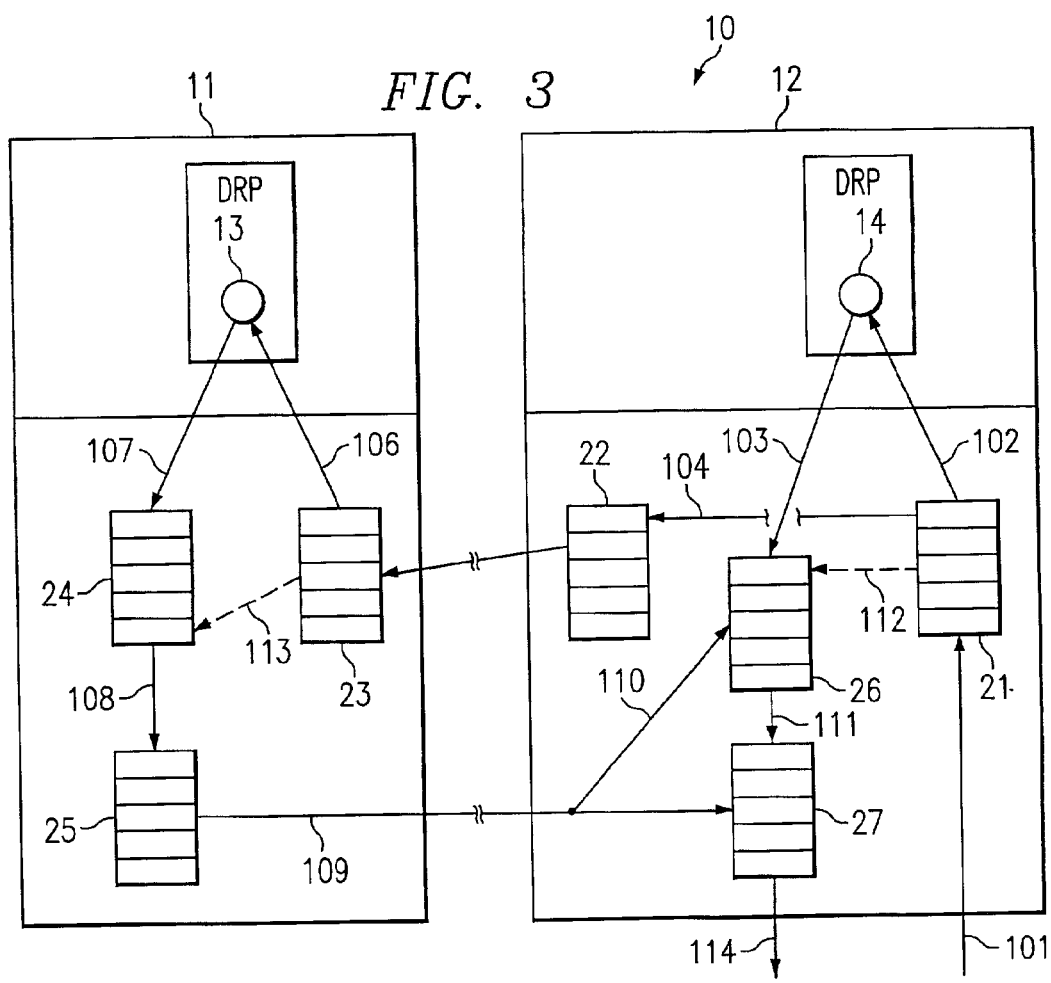
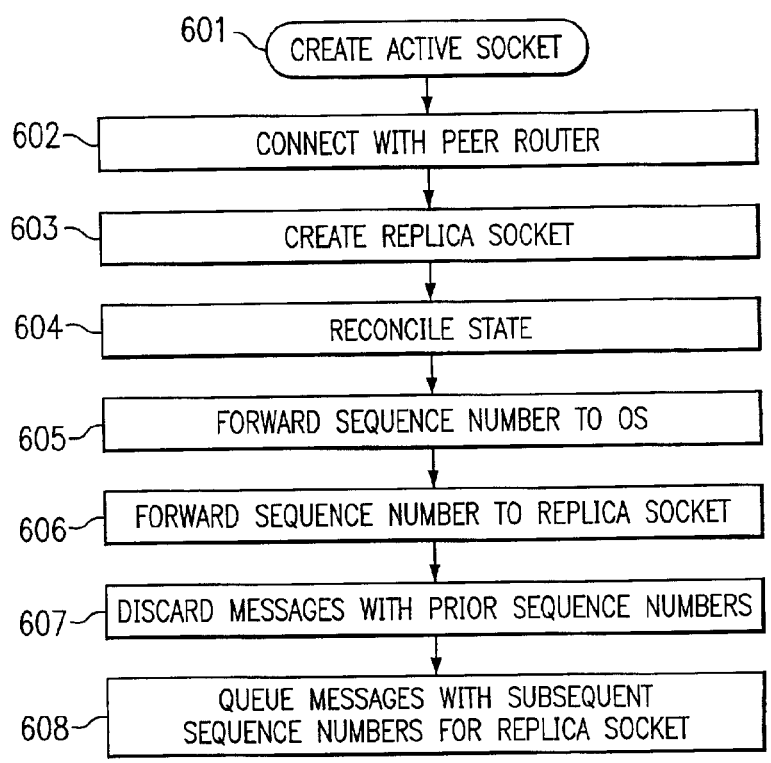

US 6,853,617 B2

SYSTEM AND METHOD FOR TCP CONNECTION PROTECTION SWITCHING

RELATED APPLICATIONS

This application is related to co-pending and commonly assigned U.S. application Ser. No. 09/703,057, entitled "System And Method For IP Router With an Optical Core," filed Oct. 31, 2000, the disclosure of which is hereby incorporated herein by reference.

TECHNICAL FIELD

This application relates to the field of optical communication networks, and particularly to TCP connection protection switching.

BACKGROUND

Transmission Control Protocol (TCP) is an underlying connection protocol that is typically used for all types of network communication. Different network routers set up connections with their peer routers using Border Gateway Protocol (BGP) over TCP to get route information from their peer routers allowing them to construct essentially an internal map of the network and to select the route that they should use, as well as verification that their peers are operating correctly. This is accomplished by sending various keep-alive and route update packets back and forth to make sure that their peers are still correctly functioning.

Peer routers view a conventional host router to which they are connected as a single logical entity represented essentially by the Master Control Processor (MCP). The MCP constructs route maps by establishing BGP adjacencies with peer routers using Dynamic Routing Protocol (DRP). Peer routers therefore infer that, if the MCP goes down or if their connection with it is terminated, the entire host router must have failed, and they will route around it. Conventional routers sometimes have dual redundant MCPs, but when the active MCP fails, the backup MCP essentially reboots and starts a new copy of the DRP software, which must then reestablish connections with all peer network routers. This switch-over event is visible to those peer routers, because they had established connections with the active MCP, the BGP protocol had established adjacencies with the conventional host router's BGP protocol, so they had an active link with the active MCP about which they had negotiated various parameters and routes they wanted to use. When the active MCP went down for whatever reason, those TCP connections were terminated and peer routers at the other ends of the connections knew that. They saw the connection as being closed, because a certain period of time after a link terminates, if the peer router at the other end tries to send traffic and receives no acknowledgments back, it infers that it has either lost a network path to the other end point of the link or that the other party has failed. Similar to talking through a telephone system, if there is a click and then silence, one party assumes they have lost the connection with the other party. Accordingly, if an active MCP were to fail, even if the backup MCP came on line in a conventional host router and started the routing protocol all over again, it basically would have to establish new connections. In the telephone analogy, if the phone hangs up during a conversation, one party must call the other party back.

Desired in the art are a system and method for network connection protocol, which maintains connections transparently between routers in the event of failure of an active MCP, such that a new set of connections between host router and peer routers does not have to be reestablished.

SUMMARY OF THE INVENTION

The present invention is directed to a system and method in which a router contains redundant Master Control Processors, such that if for example the active MCP fails for some reason, then the backup MCP takes over, without other peer routers being aware of the switch-over between the redundant active and backup MCPs. Both MCPs run replicated DRP protocol software on duplicated application sockets. Consequently these peer routers perceive an active connection that is up and remains up across the switch-over and furthermore has the same state as before. Despite the fact that peer routers are actually connected to a different MCP as a result of a switch-over, all the parameters that they had previously established about the connection are still valid since they are replicated on both MCPs.

The present large distributed router system can pass traffic, even without the presence of the MCP. Once the MCP programs packet forwarding modules (PFMs) on the line cards for certain information based tables and the like, then the hardware, the line card processors, and the embedded system are able to forward traffic without direct involvement of the MCP on a packet-by-packet basis. Thus the MCP generates the control tables and distributes those across the router, but once so programmed, the router passes traffic according to the way it was programmed, until the DRP software in cooperation with other routers decides to change or update and distribute some routes. Accordingly, the present system is not a monolithic entity, but rather a decentralized set of entities. Nevertheless, peer routers, when they see those connections close, perceive that as a failure of the entire router. To avoid this, TCP connections are kept open across switch-over events from the active MCP to the backup MCP.

During normal operation, messages in some embodiments are routed in an input data stream through both the active and backup MCPs, such that the input data stream passes first through the backup MCP and second through the active MCP. Thus the backup MCP has read every incoming message and captured any state change before it reaches the active MCP, maintaining synchronism between the two MCPs. Outgoing messages from the active MCP then return to the backup MCP, which thus reads both incoming and outgoing messages. Additionally, in some embodiments both MCPs maintain replicated sets of output queues in which they store replicated messages that are transmitted to the peer router. If an acknowledgment for a transmitted message is received from the destination peer router, then the replicated message is deleted from queues in both MCPs. If acknowledgment is not received within a predetermined time period, then the stored replica message is retransmitted by either MCP.

This approach can be applied to protocols other than TCP, for example User Datagram Protocol (UDP) over Internet Protocol (IP). In some embodiments message splicing is performed in connection with a switch-over between active and backup MCPs, assuring that no messages are lost and that no partial message is received in a peer router.

Elements utilized in some embodiments of the invention are described in co-pending and commonly assigned U.S. application Ser. No. 09/703,057, entitled "System And Method For IP Router With an Optical Core," filed Oct. 31, 2000, the disclosure of which has been incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 is a schematic diagram representing rerouted message flows in the event of loss of active MCP and switch-over of active MCP functions to backup MCP;

FIG. 6 is a flow diagram illustrating seamless splicing of the input message stream received by the DRP application in the event of a switch-over.

DETAILED DESCRIPTION

Figure 1:
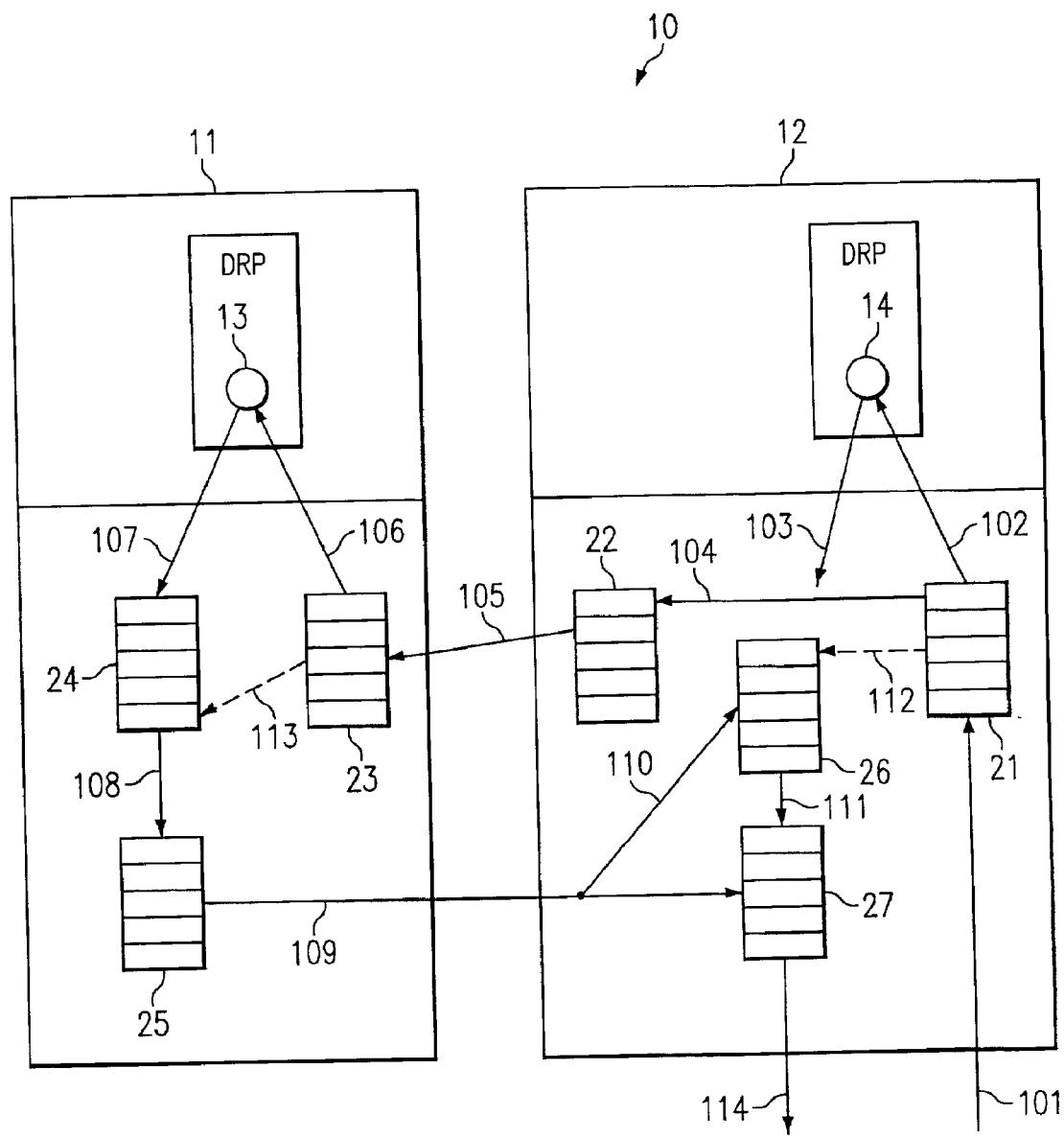
FIG. 1 is a schematic diagram illustrating a duplicate processing approach to peer router connection protection in a TCP environment, according to an embodiment of the present invention.

FIG. 1 is a schematic diagram illustrating a duplicate processing approach to peer router connection protection in a TCP environment, according to an embodiment of the present invention. TCP is a reliable connection oriented protocol, which means that once an application sends data over to this protocol, the underlying protocol by way of the operating system guarantees that the data will be received on the other end, or else the connection is closed. So in other words, it is not a lossy protocol in the sense that some data is received and some is not. This is complicated, because the networks that the protocol is using to transmit the data are lossy, i.e., they lose data. One complication then is that every bit of data that is to be sent out must be stored in case it is not received by the peer router, and after a certain period of time, the peer either acknowledges it using conventional protocols, or the sender assumes that the data has been lost and it retransmits that data.

FIG. 1 illustrates a redundant Master Control Processor (MCP) unit 10 containing an active MCP 11 and a backup MCP 12. Each MCP 11, 12 contains a respective socket 13, 14 for duplicate copies of the connection application and Dynamic Routing Protocol (DRP). Active MCP 11 includes queues 23, 24, and 25 associated with application socket 13, and backup MCP 12 includes queues 21, 22, 26, and 27 associated with application socket 14, which are used for storage of incoming and outgoing messages and for retransmission of messages if necessary. An input link 101 carries incoming control and configuration messages into backup MCP 12. An output link 114 sends out control and configuration messages and response messages to peer routers across the network. Queues 21 through 27 and application sockets 13 and 14 are interconnected through data links 102 through 113.

In some embodiments output queue 25 and retransmission queue 24, both associated with application socket 13, are combined into a single queue. Similarly, in some embodiments queues 26 and 27, both associated with application socket 14, are combined with one another. It should be noted that data links 102, 103, 104, 106, 107, 108, 110, and 111 each lying entirely within respective MCP 11, 12 are typically not physical data links, but represent message flows only. Nevertheless, for purposes of simplicity these are referred to herein as data links.

To maintain a TCP connection across two router systems during MCP switch-over, a number of considerations are of importance. First, it is important to arrange that any data transmitted over a connection can be received by the peer router at the other end of the connection, independent of whether active application socket 13 is still functioning or whether a switch-over has occurred and backup application socket 14 has taken over. This means that the retransmission queues, for example queue 24, maintained on active MCP 11 have to be replicated on backup MCP 12. Accordingly, outgoing packets from active DRP application socket 13 flow out from that socket to a peer router along a path through data link 107 and queues 24 and 25, and then through data links 109 and 110 into corresponding queues 26 and 27 of backup MCP 12 before going out through output link 114 to the peer router. Outgoing packets are stored for retransmission in queue 24 on active MCP 11, but they also flow through the backup system across data links 109 and 110. Outgoing packets are then also stored in backup MCP 12 on a retransmission queue 26 similar to retransmission queue 24 of active MCP 11. Thus outgoing packets can be retransmitted from either active or backup MCP 11 or 12. The net result is that once the outgoing packets arrive in both queues, if the peer router did not receive the packet and if active MCP 11 is still alive, it can retransmit the packet from queue 24. Outgoing packets also flow from active MCP 11 through data link 109 directly into output queue 27 of backup MCP 12, from which they are transmitted through output link 114 to the peer router. On the other hand, if active MCP 11 has failed for some reason and backup MCP 12 has taken over, then backup MCP 12 can retransmit the replicated packet from queue 26 through data link 111 and subsequently out through output data link 114.

Unless backup MCP 12 becomes active, any data written by the backup application on application socket 14 is discarded through broken data link 103, because the peer router is not aware of backup MCP 12 and does not communicate with it. If backup MCP 12 becomes active, then connection is established between backup application socket 14 and backup retransmission queue 26 through data link 103.

There are a number of ways familiar in the art, in which the application state can be maintained consistently between the active and backup applications. For example, the active application can send explicit messages to the backup copy of the application for each transaction, and the backup copy of the application can then update its own memory image regarding the transaction. Alternatively, the backup copy of the application can maintain the transactions in a log that is replayed when it takes over. There are a number of known techniques for keeping the states in synchronism across the two copies of the application.

A further requirement is to keep existing communication connections with peer routers open seamlessly across a switch-over between active and backup MCPs 11 and 12 for any reason. When an incoming packet is received from a peer router, it is directed first to backup MCP 12 and is placed into queue 21 of application socket 14 in use by the backup routing application, such that the backup application can in effect eavesdrop all the incoming communication that is really being handled by the active routing application in active MCP 11. An advantage of this particular topology is that backup MCP 12 can read all the messages that active MCP 11 receives. Furthermore, since packets are routed through backup MCP 12 first, active MCP 11 can never process a message unless backup MCP 12, as long as it stays alive, is guaranteed to receive that message also. This technique is important for keeping the two MCPs 11 and 12 in synchronism, because active MCP 11 can then assume that backup MCP 12 received the same message and thus each MCP can independently take appropriate action on that message, for example updating its own route tables.

Queues 22, 25, and 27 are essentially output queues containing messages waiting for transmission. Queues 21 and 23 are input queues where received messages are stored awaiting processing by the routing application, which receives the messages using sockets 14 and 13.

Among incoming messages are acknowledgments associated with sequence numbers of outgoing messages that were previously sent. The TCP protocol numbers each byte sequentially in a stream of bytes flowing in one given direction between two applications, using a 32-bit unsigned sequence number that wraps back around to zero after reaching a maximum value of $2^{32}-1$. This sequence number is inserted in the TCP header of a message. An acknowledgment number, consisting of the sequence number plus one, is sent from the receiving application back to the transmitting application, identifying the next sequence number that the sender of the acknowledgment expects to receive.

As an acknowledgment number is received, meaning that a message corresponding to that acknowledgment number has been received on the peer router, it is processed by backup MCP 12, which then deletes messages that are no longer needed for retransmission from queue 26 on backup MCP 12. Dashed data link 112 from queue 21 to queue 26 represents the processing of acknowledgment numbers. Similarly, the same incoming message is propagated over to active MCP 11 via output queue 22 through data link 105 and into input queue 23. Active MCP 11 notices at that point the acknowledgment numbers generated by the peer router indicating what the peer has received, and uses these acknowledgment numbers to delete any messages no longer needed for retransmission from queue 24, as represented by dashed data link 113 between queues 23 and 24.

Figure 2:
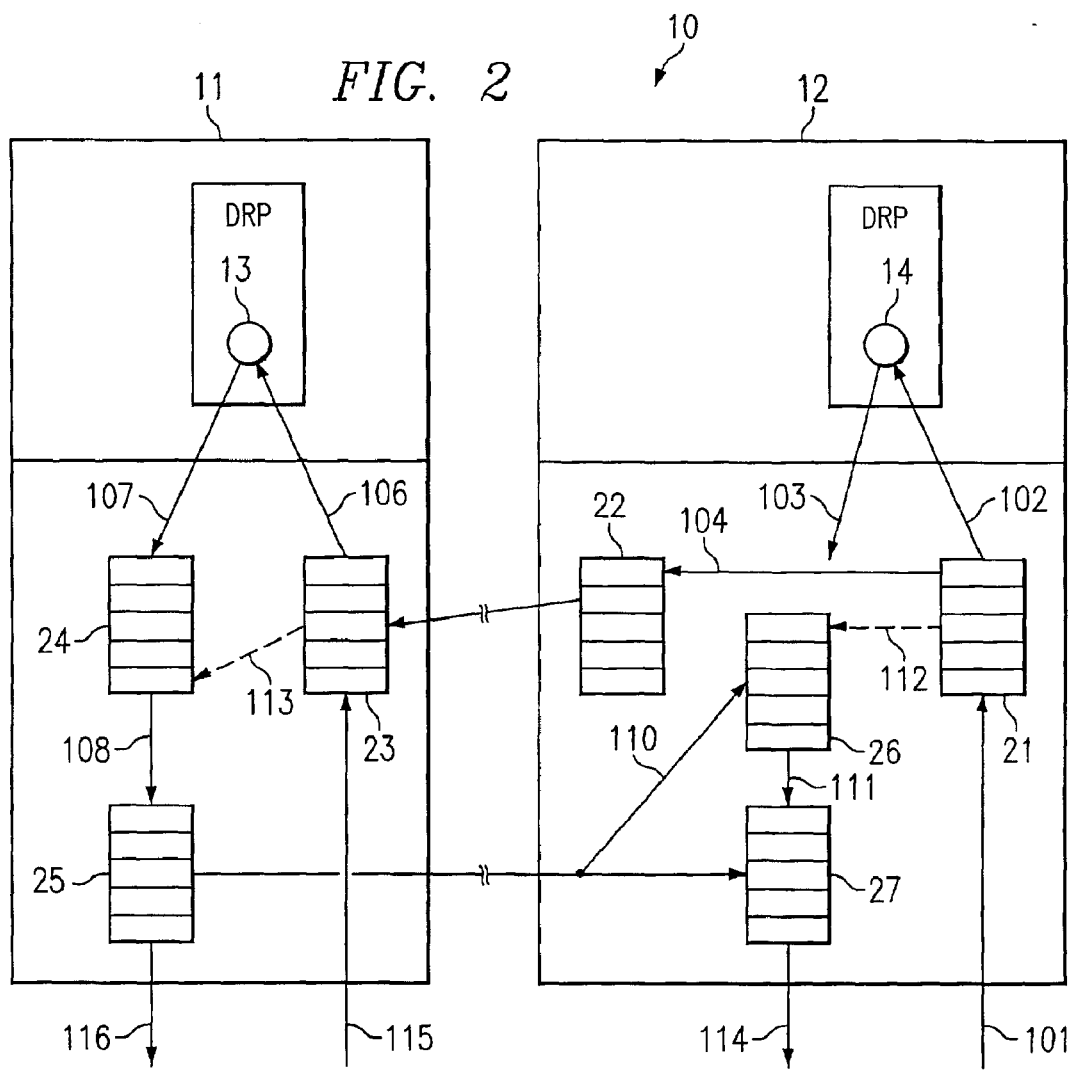
FIG. 2 is a schematic diagram representing rerouted message flows in the event of a failure of backup MCP.

In the event of failure of backup MCP 12, traffic is rerouted to flow through active MCP 11 only. FIG. 2 is a schematic diagram representing rerouted message flows in the event of a failure of backup MCP 12. Messages are received from the peer router via input link 115 and placed into queue 23 for receipt and processing by active socket 13. Messages are transmitted from active socket 13 to the peer router by way of queues 24 and 25 and via output link 116.

Similarly, in the event of loss of active MCP 11, then traffic is rerouted to flow through backup MCP 12 only, which has now become the new active MCP. FIG. 3 is a schematic diagram representing rerouted message flows in the event of loss of active MCP 11 and switch-over of active MCP functions to backup MCP 12. Messages are received from the peer router by way of input link 101 as in FIG. 1 and are placed in queue 21 for receipt by new active socket 14. The transmit path of new active socket 14 is connected to queue 26 by way of link 103, which is completed. Messages are transmitted from new active socket 14 to the peer router by way of queues 26 and 27, link 111, and output link 114.

Failure of the gigabit Ethernet link between the two MCPs (link 105 and/or 109 shown in FIG. 1) results in active MCP 11 operating in a non-protected mode, as if backup MCP 12 had failed. Backup MCP 12 goes offline until link 105 and/or 109 is repaired. Thus, in the event of failure of gigabit Ethernet link 105, 109 between MCPs 11, 12, or of either active or backup MCP 11, 12, message flow is essentially reconfigured so that the surviving active MCP is the sole receiver and sender of control and configuration traffic. Rerouting of the traffic is implemented by either IP address changes, IP address aliasing, or reprogramming the media access controller (MAC) address, all of which techniques are well known in the industry.

Figure 4:
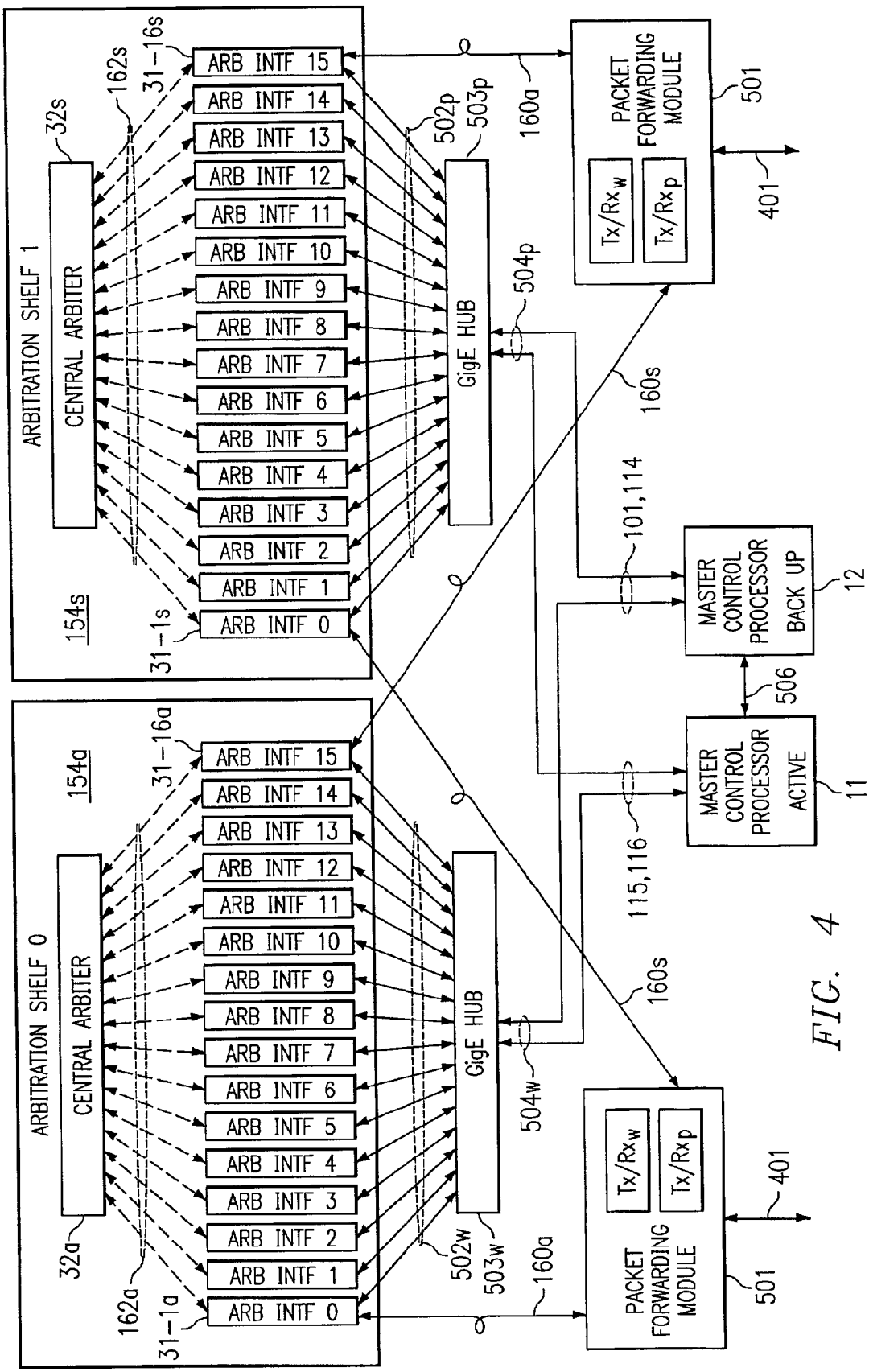
FIG. 4 is a schematic diagram illustrating the redundant communication paths that are used between MCPs and Packet Forwarding Modules (PFMs) in some embodiments of the present invention.

FIG. 4 is a schematic diagram illustrating the redundant communication paths that are used between MCPs and Packet Forwarding Modules (PFMs) in some embodiments of the present invention. These redundant communication paths enable the MCP to communicate with peer routers and to distribute routing and control information to the PFMs, such that the PFMs once programmed can independently forward traffic to and from peer routers without direct intervention of the MCP until a subsequent programming update is needed. Accordingly, in the present decentralized environment the router is not a monolithic entity, but rather a collection of distributed entities.

On the inbound side, PFMs relay incoming information that is to be used by the MCP to determine overall network topology. If a network topology change occurs, then considerable traffic will go through the network from one MCP on one router to a different MCP on a different router enabling them to communicate with one another, such that they all understand the new network topology. Accordingly, traffic flows both from the PFMs to the MCP and in the reverse direction from the MCP back to the PFMs and eventually out to other routers within the overall network.

Links 101 and 114 on the Backup MCP and links 115 and 116 on the Active MCP as shown in FIGS. 1 and 2 are interconnected with peer routers through the intermediate components shown in FIG. 4. Referring to FIG. 4, each MCP 11, 12 has redundant internal gigabit Ethernet links 504w and 504p connected to redundant internal GigE Hubs 503w and 503p. Each of these links is bi-directional and can be used by the MCP for both receiving and sending messages as depicted by links 101 and 114 or links 115 and 116 of FIGS. 1 and 2.

In operation, when a peer router (not shown in FIG. 4) sends a message to active MCP 11, it first flows from the peer router through an external data link 401 to a Packet Forwarding Module (PFM) 501. PFM 501 determines that the message is to be routed to active MCP 11, and sends it over one of redundant internal links 160a, 160s to one of redundant ARB Interface Modules 31-1a through 31-16a and 31-1s through 31-16s. From the ARB Interface Module the message is routed over one of redundant links 502w and 502p to one of redundant internal GigE Hubs 503w and 503p, where it is then routed to active MCP 11 (using FIG. 2 link 115) or if both MCPs are operating in a protected configuration to backup MCP 12 (using FIG. 2 link 101).

Referring to FIGS. 1–3, when an MCP 11, 12 sends a message to a peer router, the message flows out through link 114 or 116, and through one of redundant paired links depicted as links 504w and 504p in FIG. 4 to one of redundant GigE Hubs 503w, 504p. From GigE HUB 503w, 503p the message is routed to an appropriate one of redundant ARB Interface Modules 31-1a through 31-16a and 31-1s through 31-16s using one of redundant links 502w or 502p, and from there the message is passed back to PFM 501 using one of redundant links 160a, 160s, where it is sent to the peer router over external data link 401. Other elements represented in FIG. 4 do not participate in message flows between MCPs 11, 12 and PFMs 501, and are therefore not discussed herein.

A technical advantage of the present embodiment is that active MCP 11 transmits and receives the same amount of traffic in the protected mode as it would have in the unprotected mode. Accordingly, for each transaction active MCP 11 effectively receives one message and sends out one message. Backup MCP 12, however, processes two messages, namely one received from the peer router via link 101 and sent to active MCP 11 via link 105, and one received from active MCP 11 via link 109 and sent to the peer router via link 114. This message flow topology minimizes the computation overhead on active MCP 11, which often performs more processing than does backup MCP 12.

One consideration involves seamlessly splicing the output message stream transmitted to the peer router, which must see a logical sequence of complete messages, and which must not receive any partial messages. The output streams can be spliced only at a logical message boundary, such that only complete messages m, . . . , n–1 are generated by active MCP 11, and complete messages n, . . . , o are generated by backup MCP 12, which is becoming the new active MCP. To do that requires a protocol in which the data flowing through MCP unit 10 is basically divisible into message records or transactions. TCP is a stream oriented protocol, but BGP protocol is transaction oriented and is thus a candidate to implement message splicing.

Figure 5:
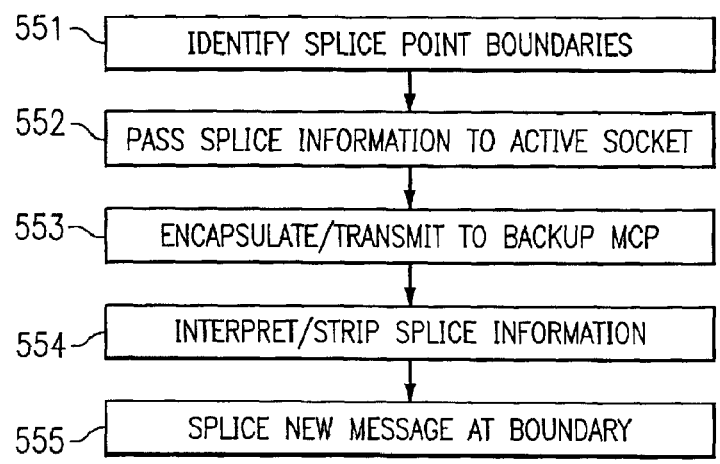
FIG. 5 is a flow diagram illustrating a protocol for seamless splicing of outgoing messages in the event of a switchover from active MCP to backup MCP, according to an embodiment of the present invention.

FIG. 5 is a flow diagram illustrating a protocol for seamless splicing of outgoing messages in the event of a switchover from active MCP 11 to backup MCP 12, according to an embodiment of the present invention. At block 551 the routing application running on active MCP 11 identifies at what points the messages can be spliced, and at block 552 passes this information to active socket 13. In the present embodiment, at block 553 active MCP 11 encapsulates messages with additional information and then transmits the encapsulated messages to backup MCP 12. Backup MCP 12 then interprets and strips the additional information at block 554 before forwarding the message to the peer router. Included in this additional information is the identification of splice point boundaries. In the event of a switch-over, backup MCP 12 that is transitioning to active splices new messages at block 555 from new active socket 14 via data link 103 immediately after a completed message in queue 26 as indicated by the splice point information received from active MCP 11 at block 554.

The present embodiment does not provide for seamless switch-over of any application socket that is in the process of connecting. That is to say, a socket switch-over is not seamless until active MCP 11 has completed a connection and at some time slightly thereafter, when socket 13 is paired with socket 14, and they have achieved consistent state between each other. At that point a seamless switch-over of the socket becomes possible. If the DRP software is in the process of making a connection with a peer, that activity is lost during a switch-over. However, other peer routers that are already connected on other sockets paired for high availability are not lost. This does not present a problem, because the principal concern is with established connections where the routers have already invested substantially to exchange state information between one another, and where loss of that state information would mean that one router must reroute around the second router. When the connection is reestablished, the second router must retransfer all of those route tables, which can be very large.

FIG. 6 is a flow diagram illustrating seamless splicing of the input message stream received by the DRP application in the event of a switch-over. Active socket 13 is created at block 601, and connection is established with the peer router at block 602. Then replica socket 14 is created at block 603 and begins eaves-dropping messages to and from active socket 13 and reconciling state at block 604, such that replica socket 14 achieves a consistent state with active socket 13. After replica socket 14 is created and readied for use, the first receive operation on replica socket 14 must return data from the beginning of a message and not start in the middle of a message. At block 605 the active DRP application must recognize at which particular message boundary the backup DRP application will begin to receive the duplicated messages on replica socket 14. For example, messages having sequence numbers m, . . . , n–1 are received only by the active DRP application on socket 13, but afterwards when sockets 13 and 14 are brought to a consistent state, messages having sequence numbers n, . . . , o are replicated and received by both sockets 13 and 14. In the present embodiment, this is accomplished at block 605 by active DRP application identifying message boundaries via active socket 13 to the operating system, which at block 606 forwards an explicit message to backup MCP 12 via queue 25 and link 110, indicating the sequence number at which messages should start on replica socket 14. At block 607 backup MCP 12 discards all messages received from input queue 21 prior to the indicated sequence number, but at block 608 messages received after the indicated sequence number are queued on input queue 21 for reception via replica socket 14.

Additionally, the present embodiment is advantageous, even if it does not switch over seamlessly 100 percent of the time. If there are counter cases, rare states the system might reach, in which for short periods a transparent switch-over for a particular application socket is prohibited, as long as the vast majority of the TCP router connections are maintained on other sockets, for example with 90 percent or higher success, the present embodiment nevertheless provides a substantial advantage over existing routers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication network incorporating a router system, said router system comprising:
   an active processor containing a first copy of a router software application that has an active application socket operable to transmit and receive data to and from another network element; and
   a backup processor interconnected with said active processor, said backup processor containing a second copy of said router software application that has a replica of said active application socket, said replica application socket operable to transmit data to and receive data from said other network element,
   such that said replica of said active application socket can maintain an open network connection enabling said backup processor to function as said active processor in the event of failure of said active processor, without the necessity of reestablishing a connection with said other network element.

2. The network of claim 1 wherein said active application socket and said replica application socket are operable to use Transmission Control Protocol (TCP) to communicate with said other network element.

3. The network of claim 1 wherein said active application socket and said replica application socket are operable to use Internet Protocol (IP) to communicate with said other network element.

4. The network of claim 1 wherein said active application socket and said replica application socket are operable to use User Datagram Protocol (UDP) to communicate with said other network element.

5. The network of claim 1 wherein said router software application is a Dynamic Routing Protocol (DRP) application.

6. The network of claim 1 comprising:
   at least two said active application sockets each operable to connect with another network element; and
   a number of said replica application sockets equal to the number of said active application sockets, each active application socket paired with one said replica application socket, such that each connection established by an active application socket can be maintained in an open and operational state should said backup processor function as said active processor if said active processor fails.

7. The network of claim 1 wherein said router system further comprises a plurality of packet forwarding modules (PFMs), said PFMs being distributed across said router system, each said PFM being interconnected remotely with both of said active processor and said backup processor.

8. The network of claim 7 wherein said PFMs are interconnected with both of said active processor and said backup processor through redundant data links.

9. The network of claim 7 further comprising a plurality of peer routers remote from said router system, said peer routers being interconnected with said router system through said PFMs.

10. The network of claim 1 wherein said backup processor and said active processor are interconnected with one another through a gigabit Ethernet link.

11. A method of connection protection switching in a communication network, comprising:
    running concurrently within a router first and second copies of a router software application;
    creating a first application socket associated with said first copy of said router software application;
    creating a replica socket associated with said second copy of said router software application, said replica socket replicating said first application socket;
    synchronizing state changes between said first and second copies of said router software application;
    distributing network route information from said first copy of said router software application to a plurality of packet forwarding modules (PFMs);
    performing network routing functions between peer routers and said plurality of PFMs using said distributed network route information without direct involvement of said first and second copies of said router software application;
    reading incoming messages redundantly at both of said first and second copies of said router software application; and
    switching over the functions of said first copy to said second copy of said router software application, such that network connections between said peer routers and said plurality of PFMs operate seamlessly without interruption throughout said switching over, without the necessity of reestablishing said network connections.

12. The method of claim 11 wherein said synchronizing comprises transferring explicit state messages between said first and second copies of said router software application.

13. The method of claim 11 wherein said synchronizing comprises maintaining a transaction log at said second copy of said router software application.

14. The method of claim 11 further comprising processing said incoming messages and generating response messages at said first copy of said router software application.

15. The method of claim 14 further comprising processing said incoming messages at said second copy of said router software application and discarding any said response messages generated at said second copy of said router software application.

16. The method of claim 14 wherein said response messages are distributed to said peer routers through said plurality of packet forwarding modules.

17. The method of claim 16 wherein said first and second copies of said router software application communicate with said peer routers using Transmission Control Protocol (TCP).

18. The method of claim 17 further comprising replicating and storing redundant copies of said response messages at both of said first and second copies of said router software application prior to said distributing to said peer routers.

19. The method of claim 18 wherein:
    if an acknowledgement of receipt by a peer router of said distributed response message is received from said peer router within a predetermined timing interval after said distributing, then deleting said stored copies of said distributed response message; and otherwise
    retransmitting said stored response message.

20. The method of claim 19 wherein said acknowledgement includes a Transmission Control Protocol (TCP) Acknowledgment Number.

21. The method of claim 19 wherein said copies of said stored response message are deleted first from said second copy of said router software application and are then deleted from said first copy of said router software application.

22. The method of claim 19 wherein:
if both first and second copies of said router software application are functioning normally, then retransmitting said stored response message from said first copy of said router software application; and otherwise
if said functions of said first copy have been switched over to said second copy of said router software application, then retransmitting said stored response message from said second copy of said router software application.

23. The method of claim 11 wherein said routing software application is a version of Dynamic Routing Protocol (DRP).

24. The method of claim 23 wherein:
if both of said first and second router software application copies are functioning normally, then routing said incoming messages from said PFM first to said replica socket, generating copies of said incoming messages at said replica socket, routing said message copies to said first application socket, generating response messages at said first application socket, and routing said response messages sequentially to said replica socket and out through said PFM; otherwise
if said second router software application fails to function and said first router software application copy functions normally, then rerouting said incoming messages from said PFM first to said first application socket, generating response messages at said first application socket, and routing said response messages out through said PFM, such that said messages bypass said replica socket; and otherwise
if said first router software application copy fails to function and said second router software application copy functions normally, then rerouting said input messages from said PFM first to said replica socket, generating response messages at said replica socket, and routing said response messages out through said PFM, such that said messages bypass said first application socket and such that the functions of said first router software application copy are switched over to said second router software application copy.

25. The method of claim 24 wherein said rerouting is performed using an action selected from the group consisting of changing Internet Protocol (IP) addresses, aliasing IP addresses, and reprogramming media access controller (MAC) addresses.

26. The method of claim 24 wherein said network connections between said plurality of packet forwarding modules and said peer routers are maintained uninterrupted with at least 90 percent availability throughout said switching over, without the necessity for reestablishing said network connection.

27. The method of claim 24 wherein said network connections between said plurality of packet forwarding modules and said peer routers that are not in process of being established or terminated during said switching over are maintained uninterrupted with at least 90 percent availability throughout said switching over, without the necessity for reestablishing said network connection.

28. The method of claim 11 further comprising splicing new messages following old messages subsequent to said switching over.

29. The method of claim 28 wherein said first router software application copy transmits information that defines message boundaries to said second router software application copy, such that in the event said second router software application copy functions in place of said first router software application copy, said peer routers receive no partial messages.

30. The method of claim 11 wherein said first and second copies of said router software application communicate with said peer routers using Border Gateway Protocol (BGP).

31. The method of claim 11 wherein said first and second copies of said router software application communicate with said peer routers using User Datagram Protocol (UDP) over Internet Protocol (IP).

* * * * *